(12) United States Patent
Iwamura

(10) Patent No.: US 11,378,928 B2
(45) Date of Patent: Jul. 5, 2022

(54) LADDER DIAGRAM PROGRAM GENERATION ASSISTANCE DEVICE, LADDER DIAGRAM PROGRAM GENERATION ASSISTANCE METHOD, AND RECORDING MEDIUM

(71) Applicant: OMRON Corporation, Kyoto (JP)

(72) Inventor: Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 148 days.

(21) Appl. No.: 16/639,589

(22) PCT Filed: Feb. 18, 2019

(86) PCT No.: PCT/JP2019/005779
§ 371 (c)(1),
(2) Date: Feb. 17, 2020

(87) PCT Pub. No.: WO2019/176451
PCT Pub. Date: Sep. 19, 2019

(65) Prior Publication Data
US 2020/0225634 A1   Jul. 16, 2020

(30) Foreign Application Priority Data
Mar. 14, 2018   (JP) .............................. JP2018-046575

(51) Int. Cl.
*G05B 19/05*   (2006.01)
(52) U.S. Cl.
CPC .. *G05B 19/056* (2013.01); *G05B 2219/13052* (2013.01); *G05B 2219/13053* (2013.01)
(58) Field of Classification Search
CPC ..................... G05B 19/056; G05B 2219/13052
(Continued)

(56) References Cited

U.S. PATENT DOCUMENTS

2009/0005884 A1* 1/2009 Ikegami ............... G05B 19/058
                                                                 700/18
2009/0007000 A1* 1/2009 Hasegawa ........... G05B 19/056
                                                                 715/772
(Continued)

FOREIGN PATENT DOCUMENTS

JP     2003084813 A  *  3/2003
JP     2007272679       10/2007
(Continued)

OTHER PUBLICATIONS

"International Search Report (Form PCT/ISA/210)" of PCT/JP2019/005779, dated May 21, 2019, with English translation thereof, pp. 1-2.
(Continued)

*Primary Examiner* — Jigneshkumar C Patel
(74) *Attorney, Agent, or Firm* — JCIPRNET

(57) ABSTRACT

According to the present invention, an input operation unit receives an input related to generation and editing of a ladder diagram program. A partial circuit search unit searches and extracts a partial circuit corresponding to a ladder circuit of an inputted command name when the input operation unit receives the command name of the ladder circuit to be inserted into the ladder diagram program. A display unit outputs an input candidate corresponding to the partial circuit extracted by the partial circuit search unit. A replacement processing unit receives selection of the input candidate outputted from the display unit, and replaces, with the selected input candidate, the ladder circuit, the command name of which has been inputted by the input operation unit.

11 Claims, 11 Drawing Sheets

(58) Field of Classification Search
USPC .......................................................... 700/18
See application file for complete search history.

(56) References Cited

U.S. PATENT DOCUMENTS

| | | | | |
|---|---|---|---|---|
| 2011/0295388 | A1* | 12/2011 | Iwata | G05B 19/056 |
| | | | | 700/18 |
| 2015/0094829 | A1* | 4/2015 | Iwatsu | G05B 19/056 |
| | | | | 700/86 |
| 2016/0004242 | A1 | 1/2016 | Yamaoka et al. | |
| 2016/0034259 | A1* | 2/2016 | Yamaoka | G06F 8/30 |
| | | | | 717/107 |
| 2018/0095447 | A1* | 4/2018 | Nagao | G05B 19/4097 |

FOREIGN PATENT DOCUMENTS

| | | |
|---|---|---|
| JP | 2010-238225 | 10/2010 |
| JP | 5726387 | 5/2015 |

OTHER PUBLICATIONS

"Written Opinion of the International Searching Authority (Form PCT/ISA/237)" of PCT/JP2019/005779, dated May 21, 2019, with English translation thereof, pp. 1-6.
"Search Report of Europe Counterpart Application", dated Nov. 30, 2021, p. 1-p. 7.

* cited by examiner (A)

(B)

LADDER DIAGRAM PROGRAM GENERATION ASSISTANCE DEVICE, LADDER DIAGRAM PROGRAM GENERATION ASSISTANCE METHOD, AND RECORDING MEDIUM

CROSS-REFERENCE TO RELATED APPLICATION

This application is a 371 application of the International PCT application serial no. PCT/JP2019/005779, filed on Feb. 18, 2019, which claims the priority benefit of Japan Patent Application No. 2018-046575, filed on Mar. 14, 2018. The entirety of each of the abovementioned patent applications is hereby incorporated by reference herein and made a part of this specification.

TECHNICAL FIELD

The present invention relates to a technology for assisting with generation and editing of a ladder diagram program executed by a programmable controller (PLC).

BACKGROUND

In the related art, ladder diagram programs executed by programmable controllers (PLCs) are generated by general-purpose computers such as personal computers and are uploaded to the PLCs in many cases. In general-purpose computers, programs that perform a generation and editing function of generating and editing a ladder diagram program, an upload function of uploading the ladder diagram program to PLCs, a download function of downloading the ladder diagram program from PLCs, and the like are installed.

As a device assisting with generation of a ladder diagram program, there is a device disclosed in, for example, Patent Literature 1. Patent Literature 1 facilitates an input of a variable name described as an operand of a command. In particular, when a plurality of variables has variable names differentiated by suffixing numbers, signs, or the like to the same character strings, an input of variable names is facilitated.

Specifically, in Patent Literature 1 (Japanese Patent Application Laid-Open No. 2010-238225), when one character of a character string that forms a variable name is input, all the variable names whose prefix matches character strings (confirmed character strings) confirmed by then and character strings formed by the one character presently input are extracted from a variable table. In Patent Literature 1, when the number of extracted variable names is single, the variable name is confirmed as an operand. When the number of extracted variable names is plural, character strings of portions whose prefixes match all the extracted variable names are set as confirmed character strings. In Patent Literature 1, an input of one character subsequent to the confirmed character string is received again and the foregoing operation is repeated.

SUMMARY OF INVENTION

Technical Problem

An input of a variable name described as an operand of a command is facilitated in Patent Literature 1. However, an improvement in efficiency of generation and editing jobs of the ladder diagram program in which the same ladder circuit or similar ladder circuits appear repeatedly is not realized. More specifically, an operator may not simply perform an operation of inputting the same ladder circuit or similar ladder circuits appearing repeatedly in the ladder diagram program which is being generated and edited.

The ladder circuits mentioned here are circuits that have a logical meaning and are function blocks (FB), contacts, or the like. The similar ladder circuits are circuits that have the same logical meaning and different input variables.

In generation of a ladder diagram program, an operation of repeatedly inputting the same partial circuit or similar partial circuits is a monotonous and cumbersome operation for an operator and it is easy to cause an input mistake.

An objective of the invention is to provide a technology for improving generation and editing efficiency of a ladder diagram program in which the same ladder circuit or similar ladder circuits repeatedly appear.

Solution to Problem

A ladder diagram program generation assistance device according to the invention is configured as follows to achieve the objective of the invention.

An input unit receives an input related to generation and editing of a ladder diagram program. A partial circuit search unit, when the input unit receives a command name of the ladder circuit to be inserted into the ladder diagram program, searches for and extracts a partial circuit corresponding to a ladder circuit with the received command name. For example, the partial circuit search unit extracts a partial circuit including a ladder circuit that has a command name which is the same as the input command name. The partial circuit mentioned here may be a single ladder circuit that has a logical meaning or may include a plurality of ladder circuits that have a logical meaning.

An input candidate output unit outputs an input candidate corresponding to the partial circuit extracted by the partial circuit search unit. A replacement processing unit when a selection of the input candidate output by the input candidate output unit is received, replaces, with the selected input candidate, the ladder circuit of which the command name has been input by the input unit.

Therefore, an operator can perform an operation of inputting the same ladder circuit or similar ladder circuits appearing repeatedly by performing a simple operation of inputting the command name of the ladder circuit and selecting the output input candidate in the generated and edited ladder diagram program. Accordingly, it is possible to improve efficiency of generation and editing of the ladder diagram program in which the same ladder circuit or similar ladder circuits appear repeatedly.

The partial circuit search unit may search for a ladder circuit that has a command name which is the same as the command name input in the input unit and repeatedly appears a predetermined number of times or more in the ladder diagram program which is being generated or edited, and extracts a partial circuit in accordance with the searched ladder circuit. In this configuration, it is possible to improve precision with which the input candidate to be output is a partial circuit including a ladder circuit of which a command name is input by the operation.

A variable setting unit that sets a variable of the partial circuit extracted by the partial circuit search unit may be included and the input candidate output unit may output the partial circuit in which the variable is set by the variable setting unit as an input candidate. For example, the variable setting unit may set the variable of the partial circuit extracted by the partial circuit search unit in accordance with the variable of the ladder circuit that has a command name which is the same as the command name input in the input unit and appears repeatedly a plurality number of times in the ladder diagram program which is being generated or edited.

In this configuration, since labor taken to set a variable can be reduced, it is possible to further improve efficiency of generation and editing of the ladder diagram program in which the same ladder circuit or similar ladder circuits appear repeatedly.

The partial circuit search unit may also search for and extract a partial circuit corresponding to a ladder circuit with an input variable name when the input unit receives a variable name of the ladder circuit to be inserted into the ladder diagram program. The input candidate output unit outputs an input candidate corresponding to the partial circuit extracted by the partial circuit search unit. The replacement processing unit replaces, with the selected input candidate, the ladder circuit of which the variable name has been input when a selection of the input candidate output by the input candidate output unit is received. In this configuration, it is also possible to improve efficiency of generation and editing of the ladder diagram program in which the same ladder circuit or similar ladder circuits appear repeatedly.

Advantageous Effects of Invention

According to the invention, it is possible to improve generation and editing efficiency of the ladder diagram program in which the same ladder circuit or similar ladder circuits repeatedly appear.

DESCRIPTION OF EMBODIMENTS

Hereinafter, a ladder diagram program generation assistance device according to an embodiment of the invention will be described.

Figure 1:
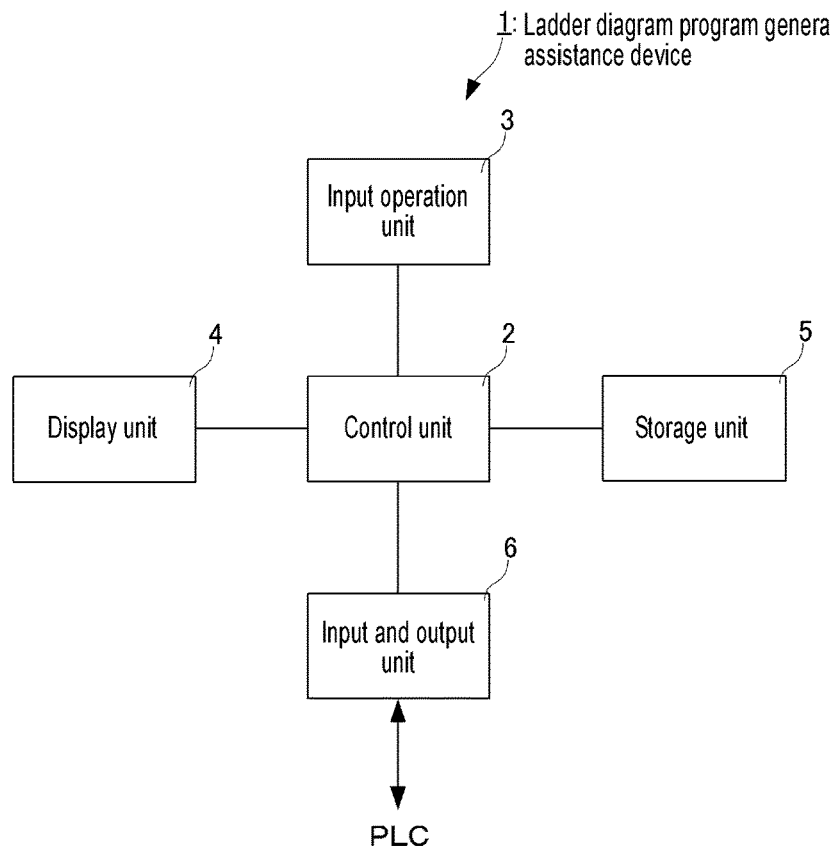
FIG. 1 is a block diagram illustrating a configuration of main units of a ladder diagram program generation assistance device.

FIG. 1 is a block diagram illustrating a configuration of main units of a ladder diagram program generation assistance device according to the example. A ladder diagram program generation assistance device 1 according to the example includes a control unit 2, an input operation unit 3, a display unit 4, a storage unit 5, and an input and output unit 6. The ladder diagram program generation assistance device 1 can be realized by a general-purpose computer in which a program that performs a generation and editing function of generating and editing a ladder diagram program, an upload function of uploading the ladder diagram to a PLC, a download function of downloading the ladder diagram program from a PLC, and the like is installed. The computer performs a ladder diagram program generation assistance method according to the invention. A ladder diagram program generation assistance program according to the invention is installed in the computer.

The control unit 2 controls an operation of each unit of the body of the ladder diagram program generation assistance device 1.

The input operation unit 3 includes an input device such as a keyboard or a mouse and receives an input in response to an operation on the input device by the operator. The input operation unit 3 is equivalent to an input unit mentioned in the invention.

The display unit 4 includes a display device such as a display and controls screen display in the display device. The display unit 4 causes the display to display a state or the like of the ladder diagram program generated and edited at that time or the body of the ladder diagram program generation assistance device 1 at that time. The display unit 4 is equivalent to an input candidate output unit mentioned in the invention.

The storage unit 5 includes a storage medium such as a hard disk or a memory and stores a program necessary for an operation of the body of the ladder diagram program generation assistance device 1, data, and a ladder diagram program.

The input and output unit 6 performs input and output of the ladder diagram program (upload or download of the ladder diagram program) to and from a programmable controller (PLC) (not illustrated).

Figure 2:
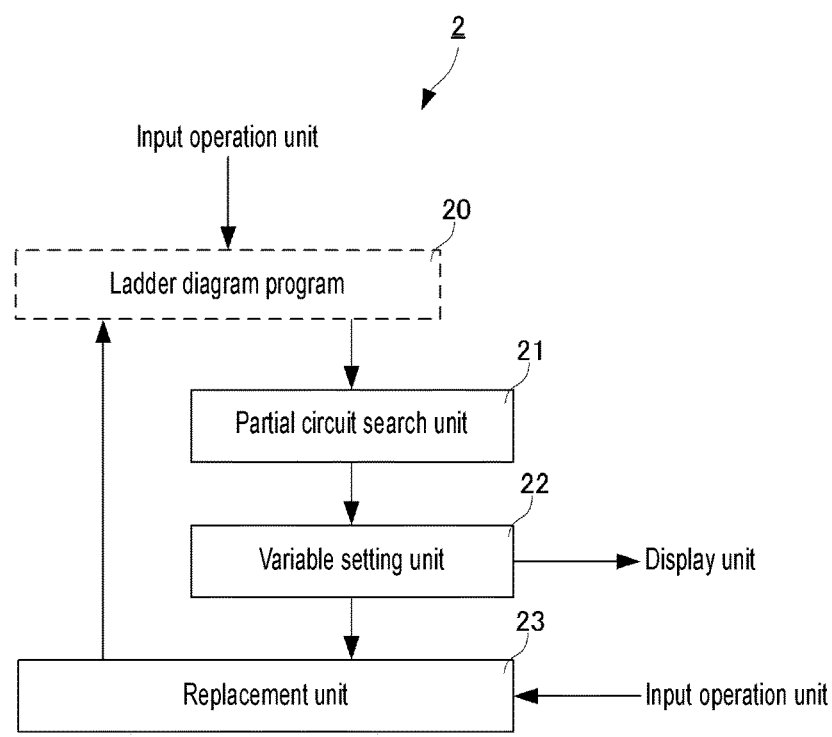
FIG. 2 is a block diagram illustrating a functional configuration of a control unit.

FIG. 2 is a block diagram illustrating a functional configuration of a control unit. The control unit 2 includes a partial circuit search unit 21, a variable setting unit 22, and a replacement processing unit 23. A ladder diagram program 20 illustrated in FIG. 2 is a program generated and edited at that time and is loaded on the control unit 2.

The partial circuit search unit 21 searches for a partial circuit corresponding to a command name of a function block (FB) for a ladder circuit input to the ladder diagram program 20 processed at a time when the operator operates the input operation unit 3. The ladder circuit mentioned here is a circuit that has a logical meaning and includes not only an FB but also a circuit element such as a contact. The partial circuit mentioned here may be a single ladder circuit that has a logical meaning or may include a plurality of ladder circuits that have a logical meaning.

The partial circuit search unit 21 searches for a partial circuit in the ladder diagram program 20 processed at that time (the partial circuit search unit 21 does not search for a partial circuit with regard to another ladder diagram program stored in the storage unit 5 or the like). The partial circuit search unit 21 searches for an FB that has a command name which is the same as the input command name in the ladder diagram program 20 processed at that time and extracts a partial circuit including the FB. In this example, the partial circuit search unit 21 searches for an FB that has a command name which is the same as the input command name in the ladder diagram program 20 processed at that time and that has already appeared a predetermined number of times (for example, a plurality of times such as twice or three times) or more in the ladder diagram program 20.

The variable setting unit 22 sets a variable in the partial circuit extracted by the partial circuit search unit 21. The variable setting unit 22 sets variables in a partial circuit presently extracted by the partial circuit search unit 21 in accordance with variables of a plurality of partial circuits searched for by the partial circuit search unit 21. For example, when the variables of the plurality of partial circuits searched for by the partial circuit search unit 21 are constant, the variable setting unit 22 sets variables with the same value. When the variables of the plurality of partial circuits searched for by the partial circuit search unit 21 are regularly changed, the variable setting unit 22 estimates and sets variables on the basis of this rule. When the variable is a structure, the variable setting unit 22 sets model-matched variables which are estimated based on the variables of the plurality of partial circuits searched for by the partial circuit search unit 21. When the variables have variable names in which signs such as numerals are suffixed to the variables, the variable setting unit 22 estimates and sets signs of the suffixes based on the variables of the plurality of partial circuits searched for by the partial circuit search unit 21. A partial circuit in which the variables are set by the variable setting unit 22 is output as an input candidate. Specifically, the display unit 4 displays the partial circuit in which the variables are set by the variable setting unit 22 as an input candidate on the display device.

When the output input candidate is selected, the replacement processing unit 23 replaces the FB to which the current command name is input in the ladder diagram program 20 processed at that time with the selected input candidate (the partial circuit in which the variables are set by the variable setting unit 22).

Hereinafter, an operation of the ladder diagram program generation assistance device 1 according to the example will be described.

Figure 3:
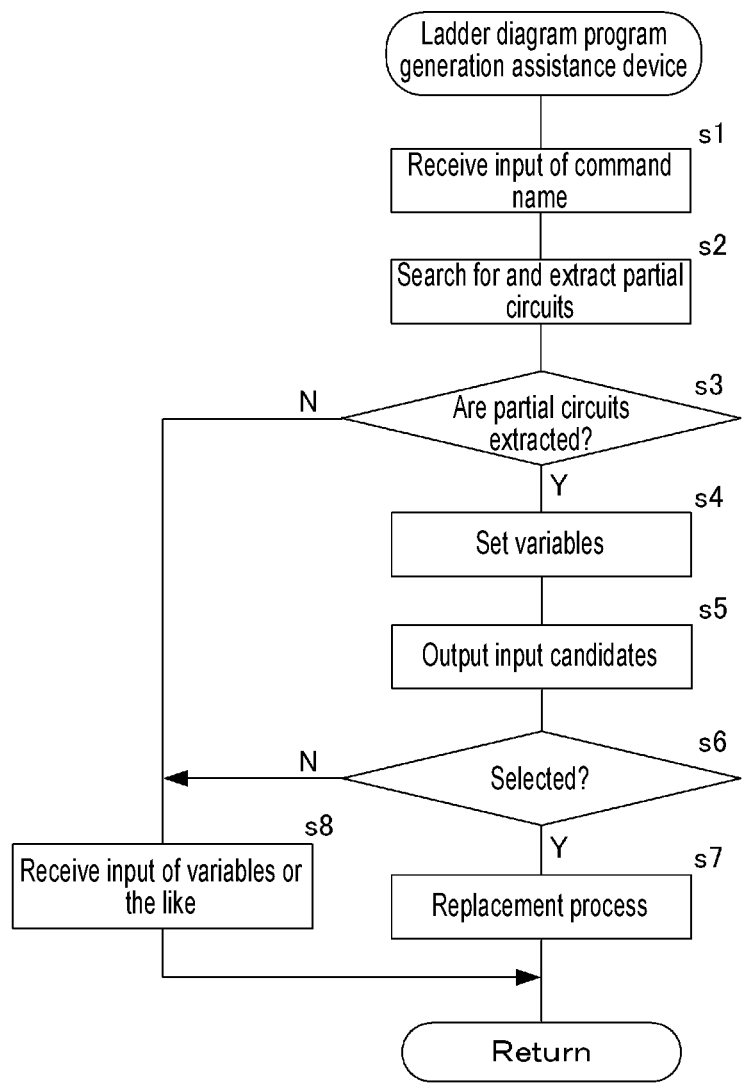
FIG. 3 is a flowchart illustrating an operation of the ladder diagram program generation assistance device.

FIG. 3 is a flowchart illustrating an operation of the ladder diagram program generation assistance device 1 according to the example. The ladder diagram program generation assistance device 1 loads the ladder diagram program 20 generated and edited at that time in the control unit 2. The operator performs an input operation related to the generation and editing of the ladder diagram program 20 in the input operation unit 3.

In the ladder diagram program generation assistance device 1, when an input of a command name of an FB related to a ladder circuit to be inserted into the ladder diagram program 20 generated and edited at that time is received (s1), the partial circuit search unit 21 searches for and extracts partial circuits (s2). A search range in which the partial circuit search unit 21 searches for the partial circuits is a range from the first row of the ladder diagram program 20 generated and edited at that time to a row in which the FBs with the presently input command name are added. The partial circuit search unit 21 searches for the FBs that have a command name which is the same as the presently input command name and that have already appeared repeatedly a predetermined number of times (for example, a plurality of times such as twice or three times) or more in the search range of the ladder diagram program 20. When the partial circuit search unit 21 cannot search for the FBs satisfying the foregoing condition, the partial circuit search unit 21 determines that there are no partial circuits corresponding to the FBs with the presently input command name.

When the partial circuit search unit 21 can search for the FBs satisfying the foregoing condition and other ladder circuits connected to the FBs are common between the searched FBs, the partial circuit search unit 21 extracts a circuit formed by the searched FBs and the other common ladder circuits as a partial circuit. In other words, when the partial circuit search unit 21 can search for the FBs satisfying the condition and other ladder circuits connected to the FBs are not common between the searched FBs, the partial circuit search unit 21 extracts the searched FB as a partial circuit.

In the ladder diagram program generation assistance device 1, when the partial circuits cannot be extracted in s2, an input of variables or the like related to the FB with the currently input command name is received (s3 and s8) and the process return to s1.

In the ladder diagram program generation assistance device 1, when the partial circuits can be extracted in s2, the variable setting unit 22 sets variables for the extracted partial circuits (s3 and s4). In s4, the variable setting unit 22 sets variables of the partial circuits which are presently input candidates in accordance with the variables of the ladder circuits searched for in s2, that is, the partial circuits (the partial circuits extracted in s2) including the FBs that have the same command name and have already appeared in the ladder diagram program 20 generated and edited at that time. For example, when the variables of the plurality of partial circuits searched for by the partial circuit search unit 21 are constant, the variable setting unit 22 sets the variables of the partial circuits which are the presently input candidates to the same value. When the variables of the plurality of partial circuits searched for by the partial circuit search unit 21 are regularly changed, the variable setting unit 22 estimates and sets the variables of the partial circuits which are the presently input candidates based on this rule. When the variables are structures, the variable setting unit 22 sets the variables of the partial circuits which are the present input candidates to model-matched variables which are estimated based on the variables of the plurality of partial circuits searched for by the partial circuit search unit 21. When the variables have variable names in which signs such as numerals are suffixed to the variables, the variable setting unit 22 sets the variables of the partial circuits which are the present input candidates by estimating signs of the suffixes based on the variables of the plurality of partial circuits searched for by the partial circuit search unit 21.

Accordingly, as the number of partial circuits extracted in s2 is larger, setting precision of the variables in s4 is better.

The ladder diagram program generation assistance device 1 outputs the partial circuits with the variables set in s4 as input candidates (s5). The display unit 4 displays the input candidates on the display device. When the input candidates displayed on the display device are desired partial circuits, the operator performs an operation of selecting an input candidate in the input operation unit 3. In the ladder diagram program generation assistance device 1, when the input candidate is selected, the replacement processing unit 23 replaces the FB with the currently input command name with the partial circuit which is the selected input candidate (s6 and s7) and the process returns to s1.

When the operator performs an operation related to an input of the variables or the like to the FBs with the currently input command name without selecting the input candidate, the ladder diagram program generation assistance device 1 receives the operation by the operator (s6 and s8) and the process returns to s1. In s8, setting of the variables or the like is performed in response to the input operation by the operator.

In this way, in the ladder diagram program generation assistance device 1 according to the example, the operator can perform an operation of inputting the same ladder circuit (the ladder circuit including the FB) or similar ladder circuits (the ladder circuits including the FBs) appearing repeatedly by performing a simple operation of inputting the command names of the FBs and selecting the output input candidate in the generated and edited ladder diagram program. Accordingly, it is possible to improve efficiency of generation and editing of the ladder diagram program in which the same ladder circuit (the ladder circuit including the FB) or similar ladder circuits (the ladder circuits including the FBs) appear repeatedly.

Since the variables are automatically set, it is possible to further improve efficiency of generation of the ladder diagram program in which the same partial circuit (the ladder circuit including the FB) appears repeatedly.

Hereinafter, the process illustrated in FIG. 3 will be described more specifically exemplifying a generation and editing procedure of the ladder diagram program 20.

Figure 4:
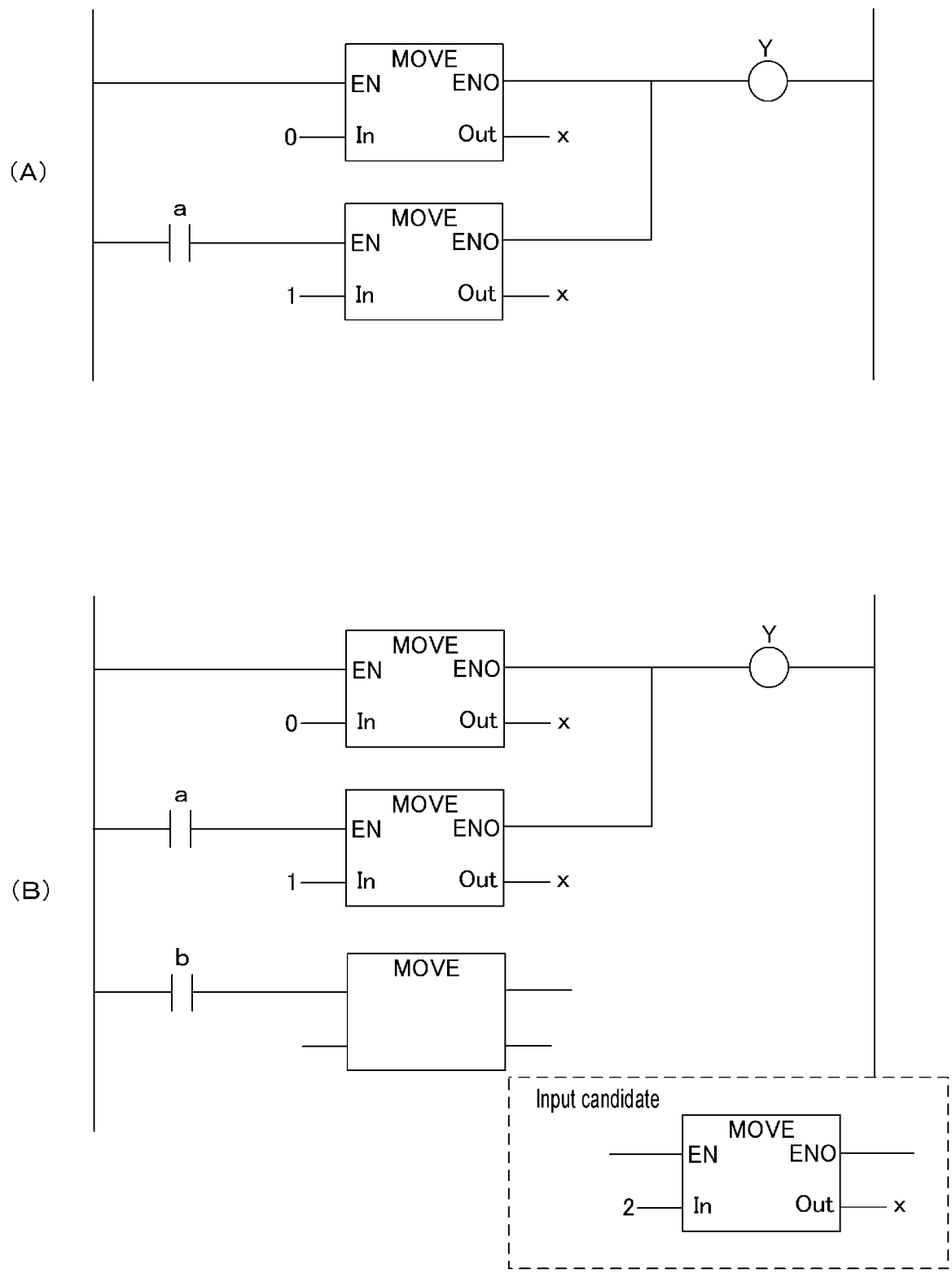
FIG. 4 includes (A) and (B), in which (A) is a diagram illustrating screen display of a display device before a command name of an FB is input and (B) is a diagram illustrating screen display of the display device after the command name of the FB is input.
Figure 5:
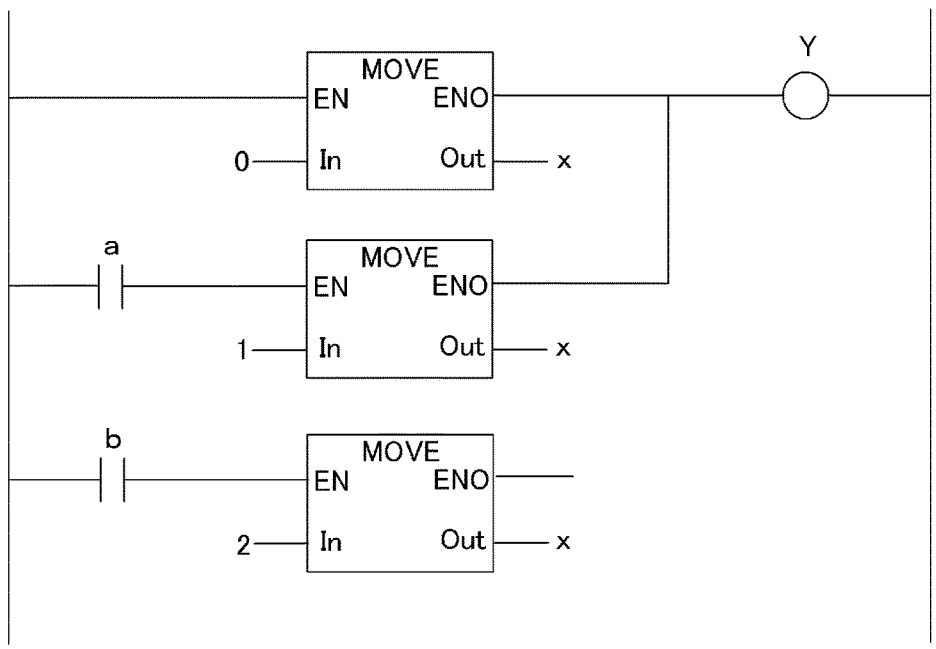
FIG. 5 is a diagram illustrating screen display of the display device after an input candidate is selected.

(A) of FIG. 4 is a diagram illustrating screen display of the display device before a command name of an FB is input. (B) of FIG. 4 is a diagram illustrating screen display of the display device after the command name of the FB is input. FIG. 5 is a diagram illustrating screen display of the display device after an input candidate is selected.

As illustrated in (A) of FIG. 4, in the ladder diagram program according to this example, two FBs with a command name MOVE have already appeared. As illustrated in (B) of FIG. 4, when the operator inputs the command name (MOVE) of the FBs to be inserted into the ladder diagram program, a partial circuit which is an input candidate is displayed on the display device. The number of input variables of the partial circuit which is the input candidate is estimated to be 2 since input variables of two FBs that have the command name MOVE and have already appeared are 0 and 1. An output variable of the partial circuit which is the input candidate is estimated to be x since the output variables of the two FBs that have the command name MOVE and have already appeared are both x.

Y illustrated in (A) and (B) of FIGS. 4, and 5 indicates a coil.

Then, when the operator performs an input operation of selecting the input candidate displayed on the display device, as illustrated in FIG. 5, the FB with the input command name is replaced with the partial circuit which is the selected input candidate.

Figure 6:
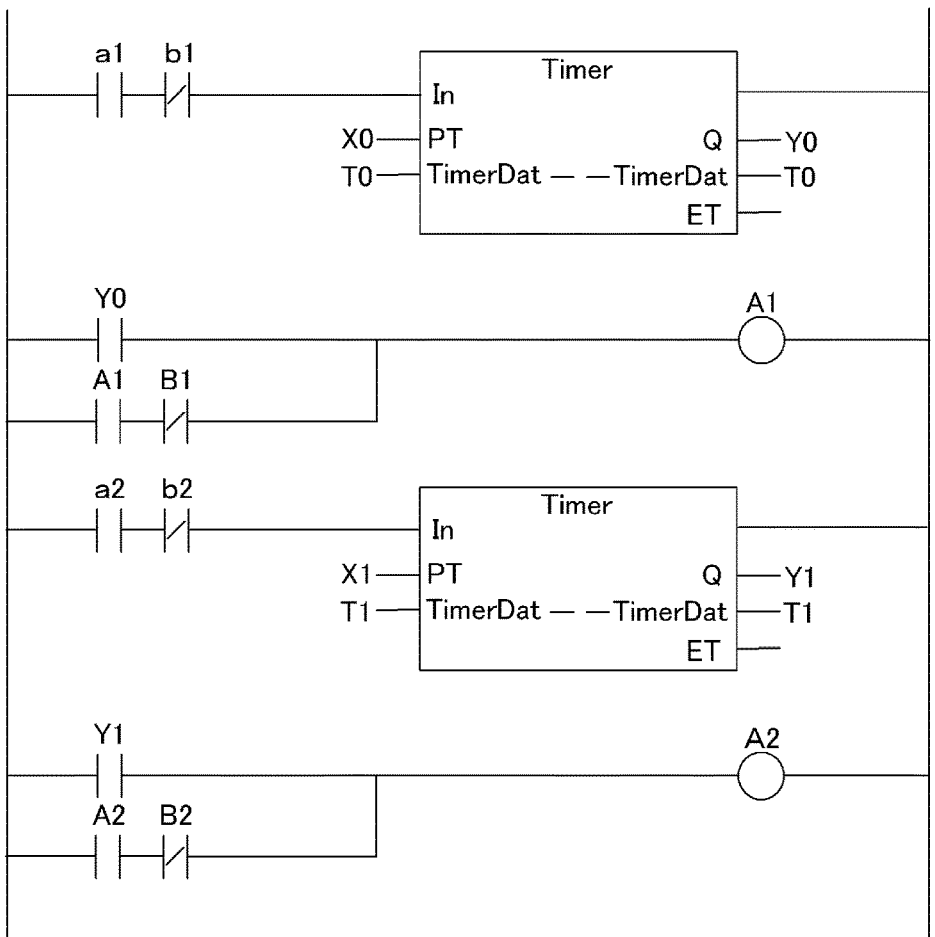
FIG. 6 is a diagram illustrating screen display of the display device before a command name of an FB is input.
Figure 7:
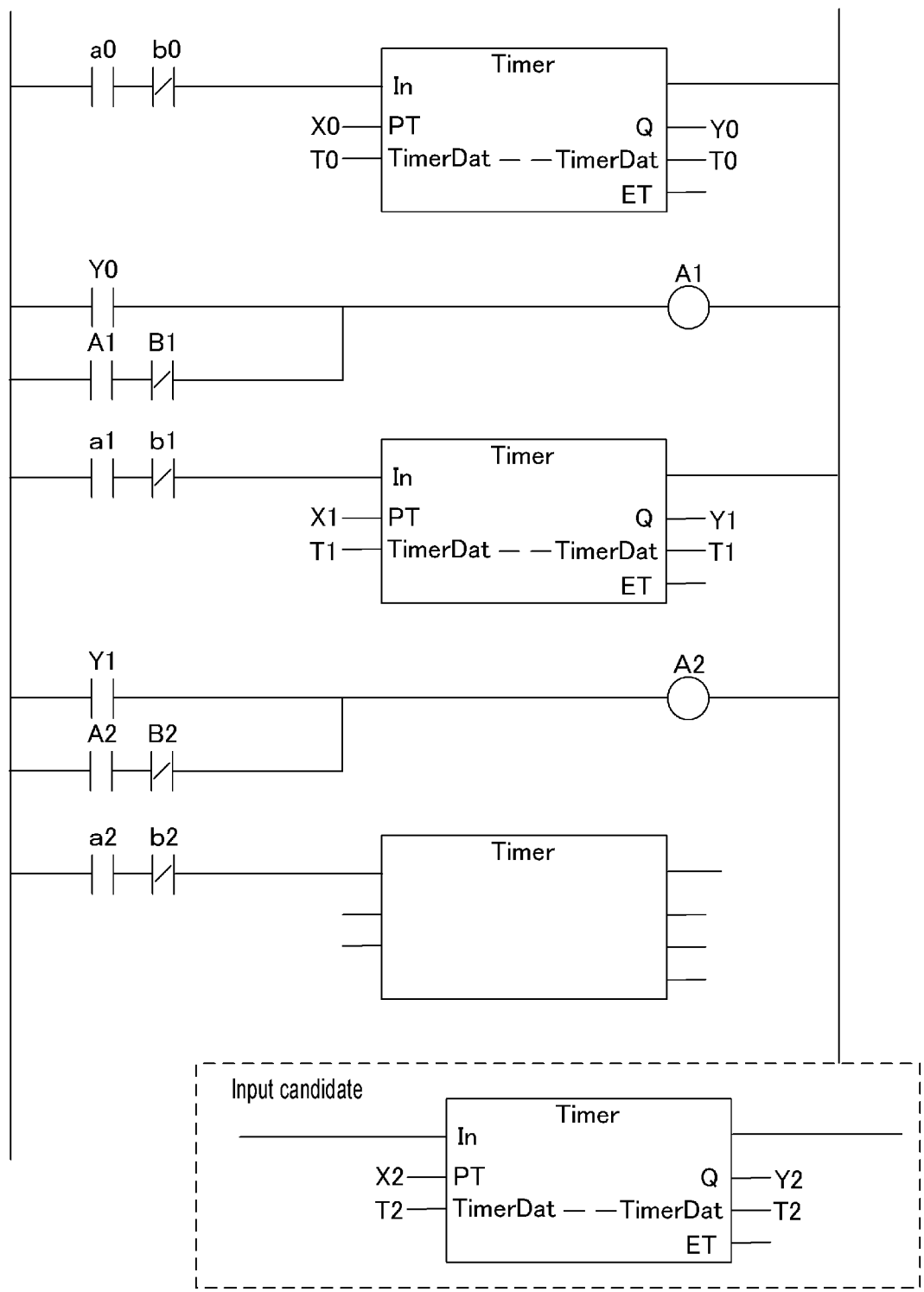
FIG. 7 is a diagram illustrating screen display of the display device after the command name of the FB is input.
Figure 8:
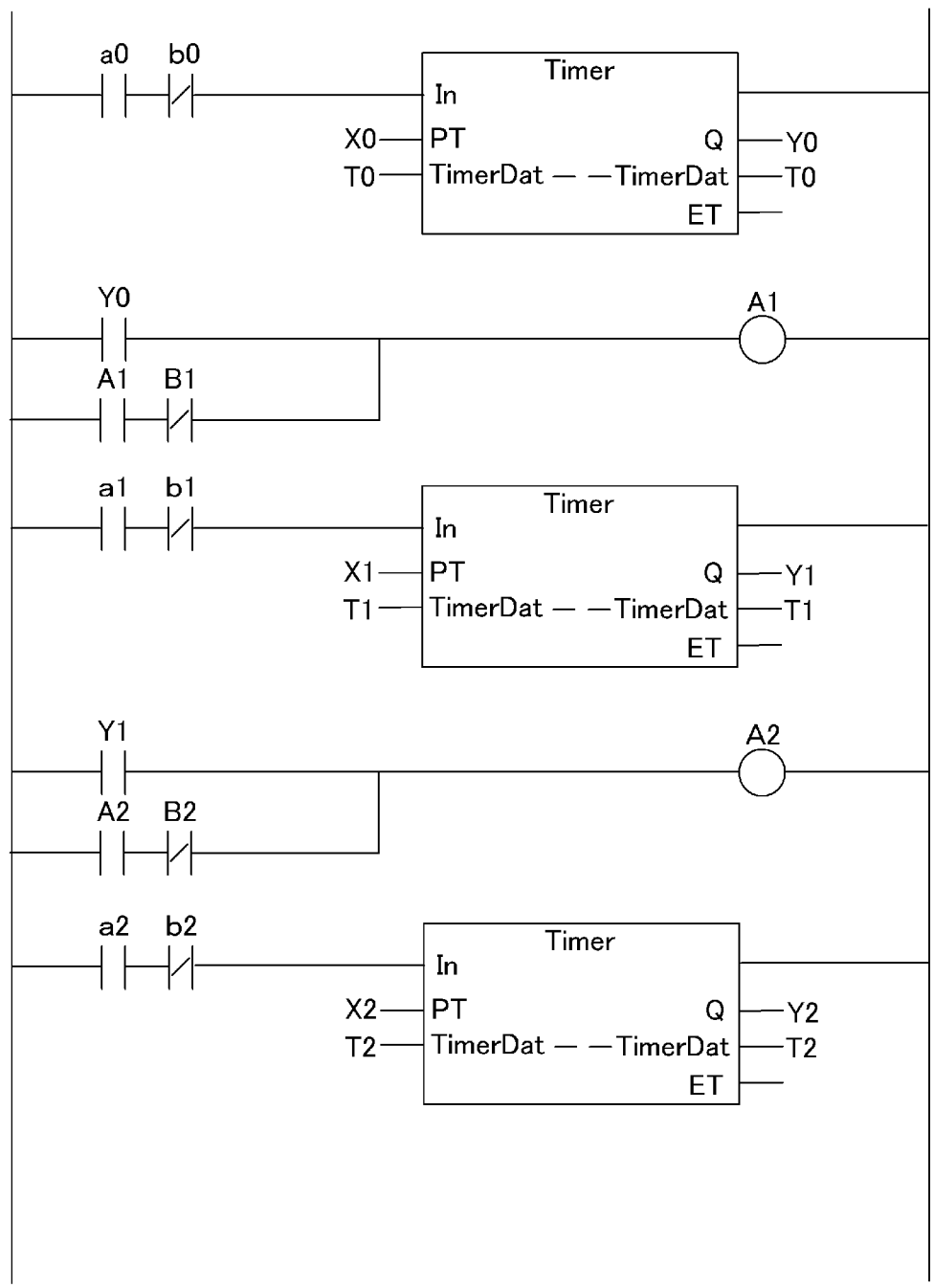
FIG. 8 is a diagram illustrating screen display of the display device after an input candidate is selected.

FIG. 6 is a diagram illustrating screen display of the display device before a command name of an FB is input. FIG. 7 is a diagram illustrating screen display of the display device after the command name of the FB is input. FIG. 8 is a diagram illustrating screen display of the display device after an input candidate is selected.

As illustrated in FIG. 6, the ladder diagram program according to this example, two FBs with a command name Timer have already appeared. As illustrated in FIG. 7, when the operator inputs the command name (Timer) of the FBs to be inserted into the ladder diagram program, a partial circuit which is an input candidate is displayed on the display device. The input variables of the partial circuit which is the input candidate are estimated to be [X2, T2] since input variables of two FBs that have the command name Timer and have already appeared are [X0, T0] and [X1, T1]. An output variable of the partial circuit which is the input candidate is estimated to be [Y2, T2] since the output variables of the two FBs that have the command name Timer and have already appeared are [Y0, T0] and [Y1, T1].

Then, when the operator performs an input operation of selecting the input candidate displayed on the display device, as illustrated in FIG. 8, the ladder circuit with the input command name is replaced with the partial circuit which is the selected input candidate.

A1 and A2 illustrated in FIGS. 6, 7, and 8 indicate coils.

Figure 9:
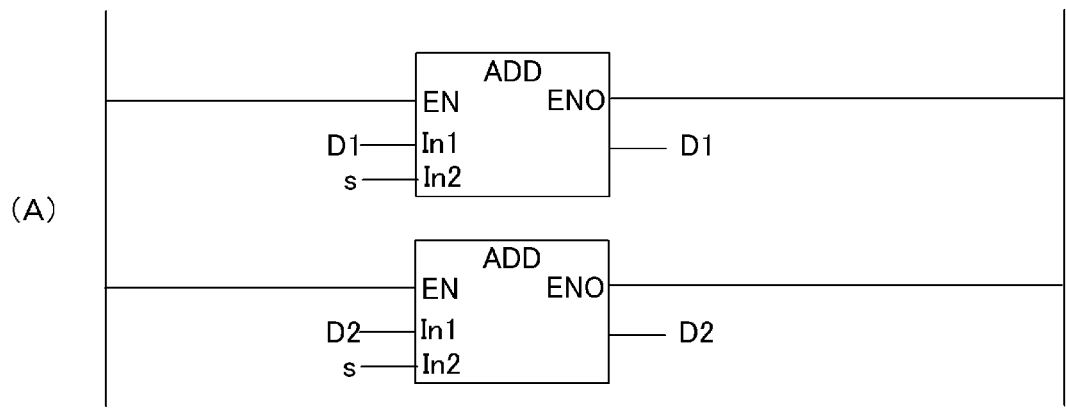
FIG. 9 includes (A) and (B), in which (A) is a diagram illustrating screen display of the display device before a command name of an FB is input and (B) is a diagram illustrating screen display of the display device after the command name of the FB is input.
Figure 9:
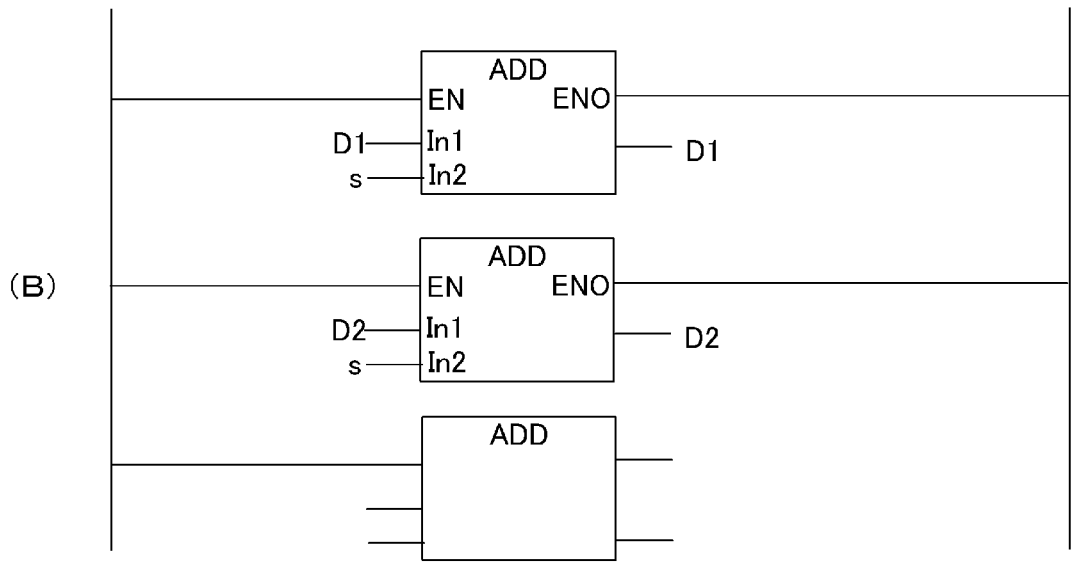
Figure 9:
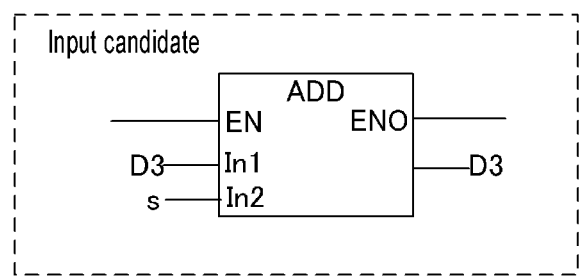
Figure 10:
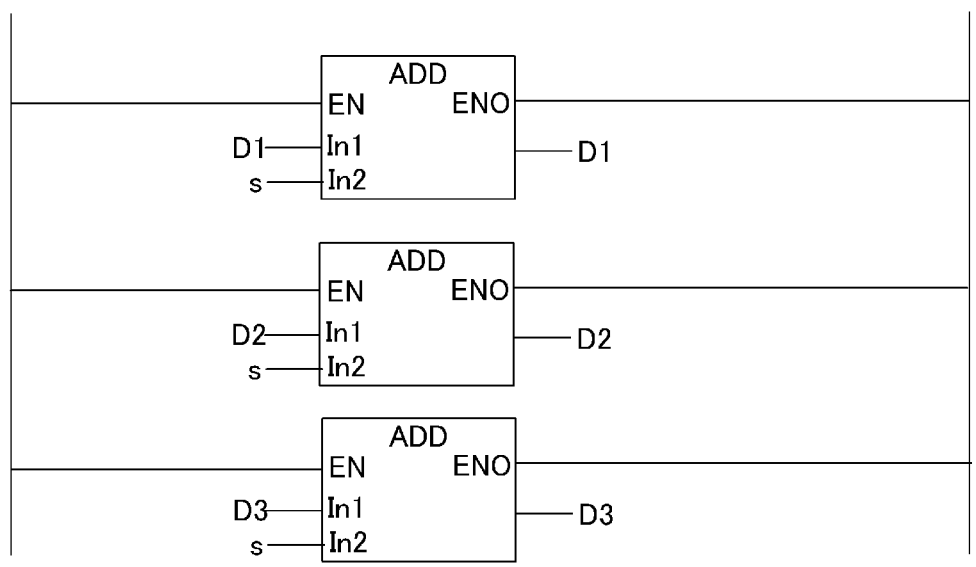
FIG. 10 is a diagram illustrating screen display of the display device after an input candidate is selected.

(A) of FIG. 9 is a diagram illustrating screen display of the display device before a command name of an FB is input. (B) of FIG. 9 is a diagram illustrating screen display of the display device after the command name of the FB is input. FIG. 10 is a diagram illustrating screen display of the display device after an input candidate is selected.

As illustrated in (A) of FIG. 9, the ladder diagram program according to this example, two FBs with a command name ADD have already appeared. As illustrated in (B) of FIG. 9, when the operator inputs the command name (ADD) of the FBs to be inserted into the ladder diagram program, a partial circuit which is an input candidate is displayed on the display device. The input variables of the partial circuit which is the input candidate are estimated to be [D3, s] since input variables of two FBs that have the command name ADD and have already appeared are [D1, s] and [D2, s]. An output variable of the partial circuit which is the input candidate is estimated to be [D3] since the output variables of the two FBs that have the command name ADD and have already appeared are [D1] and [D2].

Then, when the operator performs an input operation of selecting the input candidate displayed on the display device, as illustrated in FIG. 10, the FB with the input command name is replaced with the partial circuit which is the selected input candidate.

Figure 11:
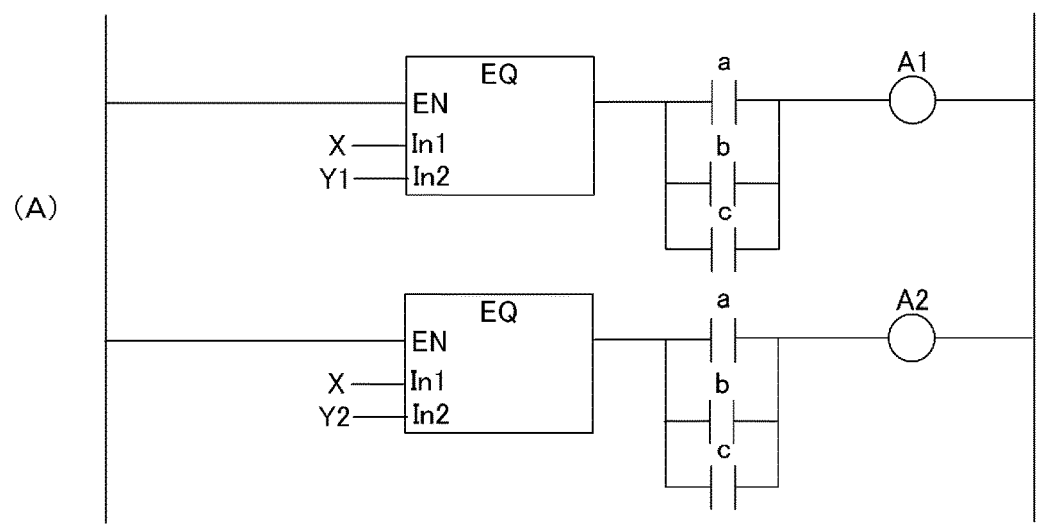
FIG. 11 includes (A) and (B), in which (A) is a diagram illustrating screen display of the display device before a command name of an FB is input and (B) is a diagram illustrating screen display of the display device after the command name of the FB is input.
Figure 11:
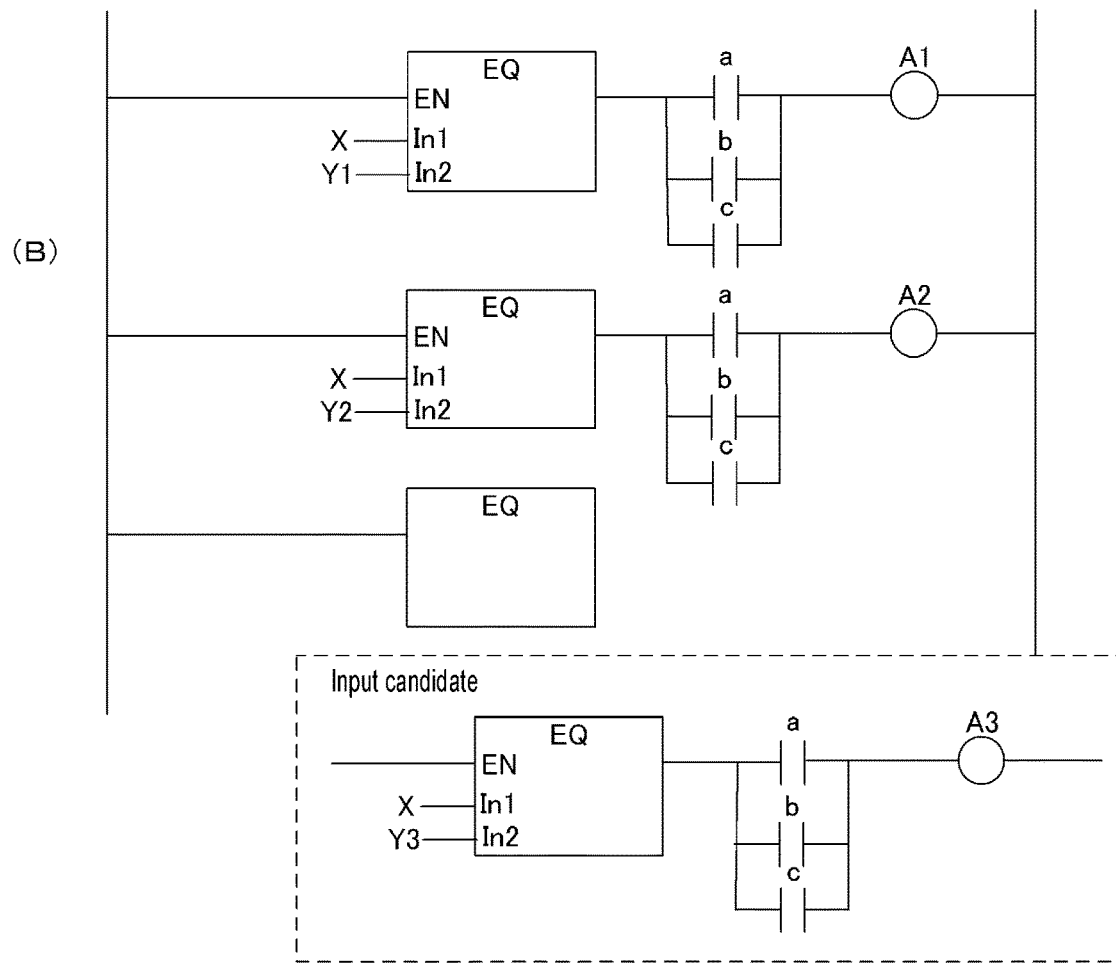
Figure 12:
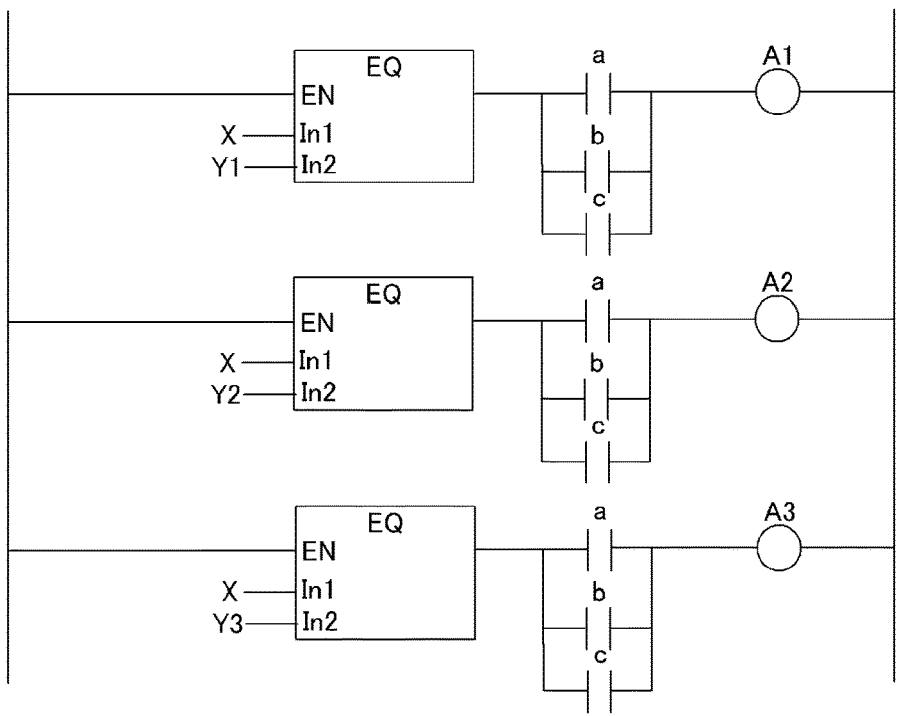
FIG. 12 is a diagram illustrating screen display of the display device after an input candidate is selected.

(A) of FIG. 11 is a diagram illustrating screen display of the display device before a command name of a ladder circuit is input. (B) of FIG. 11 is a diagram illustrating screen display of the display device after the command name of the ladder circuit is input. FIG. 12 is a diagram illustrating screen display of the display device after an input candidate is selected.

As illustrated in (A) of FIG. 11, the ladder diagram program according to this example, two ladder circuits with a command name EQ have already appeared. As illustrated in (B) of FIG. 11, when the operator inputs the command name (EQ) of the ladder circuits to be inserted into the ladder diagram program, a partial circuit which is an input candidate is displayed on the display device. In this example, contact circuits in which three contacts a, b, and c are connected in parallel and coils connected to the contact circuits are common circuits. Accordingly, in this example, a partial circuit including the contact circuit in which three contact points a, b, and c are connected in parallel and a coil connected to the contact circuit is output as an input candidate.

The input variables of the partial circuit which is the input candidate are estimated to be [x, Y3] since input variables of two ladder circuits that have the command name EQ and have already appeared are [x, Y1] and [x, Y2]. A coil of the partial circuit which is the input candidate is estimated to be A3 since the coils connected to the contact circuits in which three contacts a, b, and c are connected in parallel are A1 and A2.

Then, when the operator performs an input operation of selecting the input candidate displayed on the display device, as illustrated in FIG. 12, the ladder circuit with the input command name is replaced with the partial circuit which is the selected input candidate.

In the foregoing example, the number of partial circuits outputted as input candidates is 1, but the number of partial circuits output as input candidates may be 2 or more.

Another example will be described. In the foregoing example, when the command name of the FBs is input, the FBs that have a command name which is the same as the presently input command name and that have already appeared a predetermined number of times or more in the range from the first row of the ladder diagram program 20 generated and edited at that time to the row in which the FB with the presently input command name is added are searched for to extract the partial circuit. In the other example, when a variable name of a contact, a coil, or the like which is a circuit element of a ladder circuit is input, circuit elements that have a variable name which is the same as the presently input variable name and that have already appeared repeatedly a predetermined number of times or more in a range from the first row of the ladder diagram program 20 generated and edited at that time to a row in which the circuit element with the presently input variable name is added are searched for to extract a partial circuit. The ladder diagram program generation assistance device 1 according to this example differs from the ladder diagram program generation assistance device according to the foregoing example in that the variable setting unit 22 is not included (the other configurations are the same as the configurations of the foregoing example).

Figure 13:
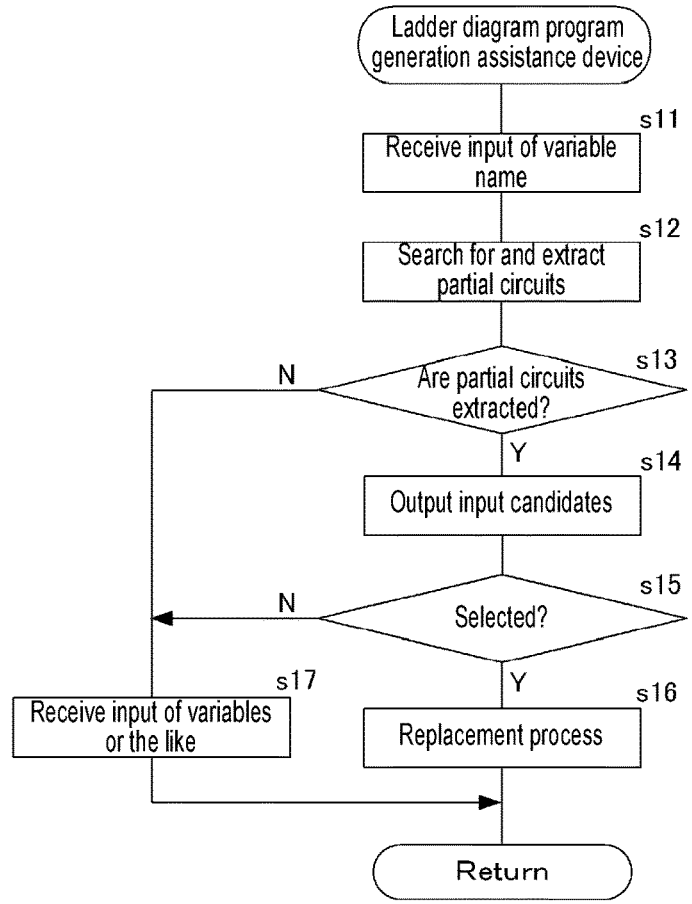
FIG. 13 is a flowchart illustrating an operation of a ladder diagram program generation assistance device according to another example.

FIG. 13 is a flowchart illustrating an operation of a ladder diagram program generation assistance device according to the example. In the ladder diagram program generation assistance device 1, when an input of a variable name of a circuit element related to a ladder circuit to be inserted into the ladder diagram program 20 generated and edited at that time is received (s11), the partial circuit search unit 21 searches for and extracts partial circuits (s12). A search range in which the partial circuit search unit 21 searches for the partial circuits is a range from the first row of the ladder diagram program 20 generated and edited at that time to a row in which the circuit elements with the presently input variable name are added, as in the foregoing example. The partial circuit search unit 21 searches for the circuit elements that have a variable name which is the same as the presently input variable name and that have already appeared a predetermined number of times (for example, a plurality of times such as twice or three times) or more in the search range of the ladder diagram program 20. When the partial circuit search unit 21 cannot search for the circuit elements satisfying the foregoing condition, the partial circuit search unit 21 determines that there are no partial circuits corresponding to the circuit elements with the presently input variable name.

When the partial circuit search unit 21 can search for the circuit elements satisfying the foregoing condition and other ladder circuits connected to the circuit elements are common between the searched circuit elements, the partial circuit search unit 21 extracts a circuit formed by the searched circuit elements and the other common ladder circuits as a partial circuit. When the circuit elements satisfying the condition can be searched for and the other ladder circuits connected to the circuit elements are not common between the searched circuit elements, the partial circuit search unit 21 according to the example determines that there are no partial circuits corresponding to the circuit elements with the presently input variable name.

In the ladder diagram program generation assistance device 1, when the partial circuits may not be extracted (when it is determined that there are no partial circuits), an input of the ladder circuits or the like connected to the circuit elements with the currently input variable name is received (s13 and s17) and the process return to s11.

In the ladder diagram program generation assistance device 1, when the partial circuits can be extracted, the extracted partial circuits are outputs as input candidates (s13 and s14). The display unit 4 displays the input candidates on the display device. When the input candidates displayed on the display device are desired partial circuits, the operator performs an operation of selecting an input candidate in the input operation unit 3. In the ladder diagram program generation assistance device 1, when the input candidate is selected, the replacement processing unit 23 replaces the circuit element with the currently input variable name with the partial circuit which is the selected input candidate (s15 and s16) and the process returns to s11.

When the operator performs an operation related to an input of the ladder circuits or the like connected to the circuit elements with the currently input variable name without selecting the input candidate, the ladder diagram program generation assistance device 1 receives the operation by the operator (s15 and s17) and the process returns to s1. In s17, the ladder circuits or the like in response to the input operation of the operator are connected to the circuit elements with the presently input variable name.

In this way, in the ladder diagram program generation assistance device 1 according to the example, when a ladder circuit formed by a plurality of circuit elements (a ladder circuit including no FBs) appears repeatedly as a partial circuit in the generated an edited ladder diagram program, the operator can perform an input operation related to the partial circuit by performing a simple operation of inputting the variable name of one circuit element belonging to the partial circuit and selecting the output input candidate (the partial circuit). Accordingly, it is possible to improve efficiency of generation and editing of the ladder diagram program in which the partial circuit formed by the plurality of circuit elements appears repeatedly.

Figure 14:
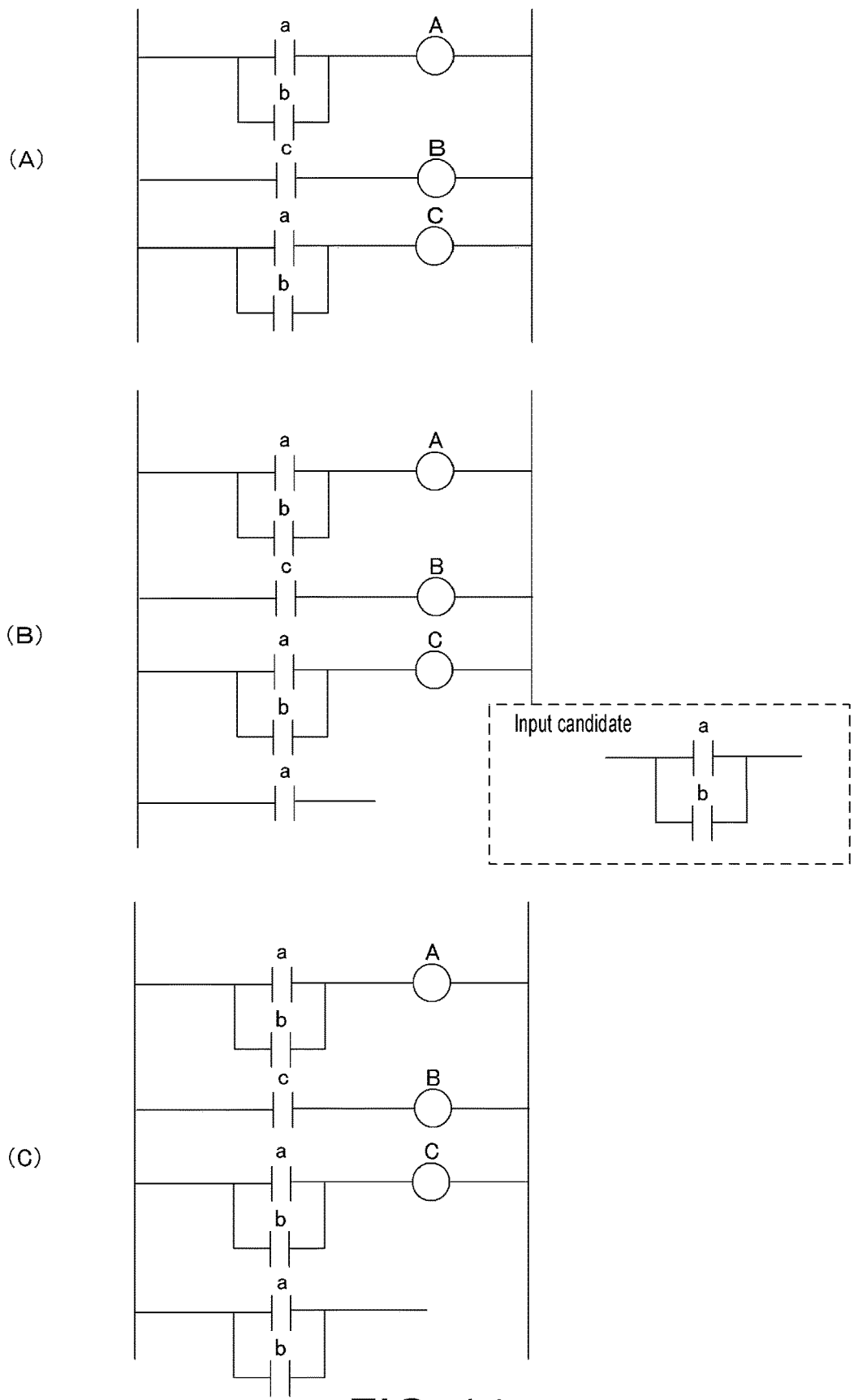
FIG. 14 includes (A), (B) and (C), in which (A) is a diagram illustrating screen display of the display device before a variable name of a circuit element of a ladder circuit is input, (B) is a diagram illustrating screen display of the display device after the variable name of the circuit element of the ladder circuit is input, and (C) is a diagram illustrating screen display of the display device after an input candidate is selected.

(A) of FIG. 14 is a diagram illustrating screen display of the display device before a variable name of a circuit element of a ladder circuit is input. (B) of FIG. 14 is a diagram illustrating screen display of the display device after the variable name of the circuit element of the ladder circuit is input. (C) of FIG. 14 is a diagram illustrating screen display of the display device after an input candidate is selected.

As illustrated in (A) of FIG. 14, the ladder diagram program according to this example, two ladder circuits in which two contacts a and b are connected in parallel have already appeared. As illustrated in (B) of FIG. 14, when the operator inputs the contact a of the ladder circuit to be inserted into the ladder diagram program, a partial circuit which is an input candidate is displayed on the display device. In this example, a partial circuit in which the two contact points a and b are connected in parallel is output as an input candidate.

Then, when the operator performs an input operation of selecting the input candidate displayed on the display device, as illustrated in (C) of FIG. 14, the ladder circuit with the input command name is replaced with the partial circuit which is the selected input candidate.

In this example, the number of partial circuits outputted as input candidates is not limited to 1, but two or more partial circuits may be output.

What is claimed is:

1. A ladder diagram program generation assistance device comprising:
    an input interface, receiving an input related to generation and editing of a ladder diagram program;
    a processor, when the input interface receives a command name of function blocks related to a ladder circuit to be inserted into the ladder diagram program generated and edited at a time, searching for a ladder circuit that has a command name which is the same as the command name input at the input interface and repeatedly appeared for a predetermined number of times or more in a search range of the ladder diagram program, and extracting the searched ladder circuit as a partial circuit, wherein a search range in which the processor searches for the partial circuit is a range from a first row at beginning of the ladder diagram program to a row in which the function block with presently input command name is to be added;
    a display, displaying the partial circuit extracted by the processor as a candidate ladder circuit corresponding to the received command name; and
    wherein when a selection of the input candidate displayed on the display is received, the processor is further configured to replace, with the selected input candidate, the ladder circuit of which the command name has been input by the input interface, and
    when the circuit and other ladder circuits connected to the function blocks are common between the searched ladder circuit, the processor further extracts a circuit formed by the searched ladder circuit and the other ladder circuits as the partial circuit.

2. The ladder diagram program generation assistance device according to claim 1, wherein the processor extracts a partial circuit including a ladder circuit that has a command name which is the same as the command name input in the input interface.

3. The ladder diagram program generation assistance device according to claim 2, wherein
    the processor is further configured to set a variable of the partial circuit extracted by the processor,
    wherein the display displays the partial circuit in which the variable is set by the processor as the input candidate.

4. The ladder diagram program generation assistance device according to claim 1, wherein
    the processor is further configured to set a variable of the partial circuit extracted by the processor,
    wherein the display displays the partial circuit in which the variable is set by the processor as the input candidate.

5. The ladder diagram program generation assistance device according to claim 4, wherein the processor sets the variable of the partial circuit extracted by the processor in accordance with the variable of the ladder circuit that has a command name which is the same as the command name input in the input unit and appears repeatedly a plurality number of times in the ladder diagram program which is being generated or edited.

6. The ladder diagram program generation assistance device according to claim 1, wherein the processor is further configured to perform an estimation on a value of an input variable of the extracted partial circuit based on a value of an input variable of function blocks that have included in the ladder diagram program.

7. A ladder diagram program generation assistance device comprising:
    an input interface, receiving an input related to generation and editing of a ladder diagram program;
    a processor, when the input interface receives a variable name of function blocks related to a ladder circuit to be inserted into the ladder diagram program generated and edited at a time, searching for a ladder circuit that has a variable name which is the same as the variable name input at the input interface and repeatedly appeared for a predetermined number of times or more in a search range of the ladder diagram program, and extracting the searched ladder circuit as and extracting a partial circuit, wherein a search range in which the processor searches for the partial circuit is a range from a first row at beginning of the ladder diagram program to a row in which the function block-with presently input variable name is to be added;
    a display, displaying, the partial circuit extracted by the processor as a candidate ladder circuit corresponding to the received variable name; and
    wherein when a selection of the input candidate displayed on the display is received, the processor is further configured to replace, with the selected input candidate, the ladder circuit of which the variable name has been input by the input interface, and
    when the circuit and other ladder circuits connected to the function blocks are common between the searched ladder circuit, the processor further extracts a circuit formed by the searched ladder circuit and the other ladder circuits as the partial circuit.

8. A ladder diagram program generation assistance method, causing a computer to perform:
    a partial circuit search step of when an input interface receiving an input related to generation and editing of a ladder diagram program receives a command name of function blocks related to a ladder circuit to be inserted into the ladder diagram program generated and edited at a time, searching for a ladder circuit that has a command name which is the same as the command name input at the input interface and repeatedly appeared for a predetermined number of times or more in a search range of the ladder diagram program, and extracting the searched ladder circuit as a partial circuit, wherein a search range in which the partial circuit search step searches for the partial circuit is a range from a first row at beginning of the ladder diagram program to a row in which the function block with presently input command name is to be added;

a display step of displaying the partial circuit extracted in the partial circuit search step as a candidate ladder circuit corresponding to the received command name; and a replacement step of when a selection of the input candidate displayed by the display step is received, replacing, with the selected input candidate, the ladder circuit of which the command name has been input by the input interface, wherein when the circuit and other ladder circuits connected to the function blocks are common between the searched ladder circuit, the processor further extracts a circuit formed by the searched ladder circuit and the other ladder circuits as the partial circuit.

9. A ladder diagram program generation assistance method, causing a computer to perform:

a partial circuit search step of when an input interface receiving an input related to generation and editing of a ladder diagram program receives a variable name of function blocks related to a ladder circuit to be inserted into the ladder diagram program generated and edited at a time, searching for a ladder circuit that has a variable name which is the same as the variable name input at the input interface and repeatedly appeared for a predetermined number of times or more in a search range of the ladder diagram program, and extracting the searched ladder circuit as a partial circuit, wherein a search range in which the partial circuit search step searches for the partial circuit is a range from a first row at beginning of the ladder diagram program to a row in which the function block with presently input variable name is to be added;

a display step of displaying an input candidate corresponding to the partial circuit extracted in the partial circuit search step; and a replacement step of when a selection of the input candidate displayed by the display step is received, replacing, with the selected input candidate, the ladder circuit of which the variable name has been input by the input unit interface, when the circuit and other ladder circuits connected to the function blocks are common between the searched ladder circuit, the processor further extracts a circuit formed by the searched ladder circuit and the other ladder circuits as the partial circuit.

10. A non-transitory computer readable recording medium that stores a ladder diagram program generation assistance program, the ladder diagram program generation assistance program causing a computer to perform:

a partial circuit search step of when an interface receiving an input related to generation and editing of a ladder diagram program receives a command name of function blocks related to a ladder circuit to be inserted into the ladder diagram program generated and edited at a time, searching for a ladder circuit that has a command name which is the same as the command name input at the input interface and repeatedly appeared for a predetermined number of times or more in a search range of the ladder diagram program, and extracting the searched ladder circuit as a partial circuit, wherein a search range in which the partial circuit search step searches for the partial circuit is a range from a first row at beginning of the ladder diagram program to a row in which the function block with presently input command name is to be added;

a display step of displaying the partial circuit extracted in the partial circuit search step as a candidate ladder circuit corresponding to the received command name; and a replacement step of when a selection of the input candidate displayed by the display step is received, replacing, with the selected input candidate, the ladder circuit of which the command name has been input by the interface, when the circuit and other ladder circuits connected to the function blocks are common between the searched ladder circuit, the processor further extracts a circuit formed by the searched ladder circuit and the other ladder circuits as the partial circuit.

11. A non-transitory computer readable recording medium that stores a ladder diagram program generation assistance program, the ladder diagram program generation assistance program causing a computer to perform:

a partial circuit search step of when an input interface receiving an input related to generation and editing of a ladder diagram program receives a variable name of function blocks related to a ladder circuit to be inserted into the ladder diagram program generated and edited at a time, searching for a ladder circuit that has a variable name which is the same as the variable name input at the input interface and repeatedly appeared for a predetermined number of times or more in a search range of the ladder diagram program, and extracting the searched ladder circuit as a partial circuit, wherein a search range in which the partial circuit search step searches for the partial circuit is a range from a first row at beginning of the ladder diagram program to a row in which the function block with presently input variable name is to be added;

a display step of displaying the partial circuit extracted in the partial circuit search step as a candidate ladder circuit corresponding to the received command name; and a replacement step of when a selection of the input candidate displayed by the display step is received, replacing, with the selected input candidate, the ladder circuit of which the variable name has been input by the input unit interface, when the circuit and other ladder circuits connected to the function blocks are common between the searched ladder circuit, the processor further extracts a circuit formed by the searched ladder circuit and the other ladder circuits as the partial circuit.

* * * * *